(12) United States Patent
Butler

(10) Patent No.: US 7,185,798 B2
(45) Date of Patent: Mar. 6, 2007

(54) APPARATUS AND METHOD FOR MECHANICALLY REINFORCING THE WELDS BETWEEN RISER PIPES AND RISER BRACES IN BOILING WATER REACTORS

(75) Inventor: Patrick J. Butler, Alexandria, VA (US)

(73) Assignee: MPR Associates, Inc., Alexandria, VA (US)

( * ) Notice: Subject to any disclaimer, the term of this patent is extended or adjusted under 35 U.S.C. 154(b) by 363 days.

(21) Appl. No.: 10/829,361

(22) Filed: Apr. 22, 2004

(65) Prior Publication Data

US 2005/0247754 A1    Nov. 10, 2005

(51) Int. Cl.
*B23K 37/00* (2006.01)
(52) U.S. Cl. .................................. 228/44.5; 269/283
(58) Field of Classification Search ............... 228/44.5; 376/461, 286, 372, 392; 269/32, 282, 283, 269/284
See application file for complete search history.

(56) References Cited

U.S. PATENT DOCUMENTS

| | | | |
|---|---|---|---|
| 1,400,801 A | | 12/1921 | Cohen |
| 4,294,444 A | * | 10/1981 | Horton ........................ 269/156 |
| 5,201,501 A | * | 4/1993 | Fassler ........................ 269/32 |
| 5,443,246 A | * | 8/1995 | Peterson ..................... 269/283 |
| 5,839,192 A | | 11/1998 | Weems et al. |
| 5,975,605 A | * | 11/1999 | Kot ............................. 294/115 |
| 6,053,652 A | | 4/2000 | Deaver et al. |
| 6,079,896 A | * | 6/2000 | Dellach ................... 403/322.3 |
| 6,086,120 A | | 7/2000 | Deaver et al. |
| 6,108,391 A | | 8/2000 | Deaver et al. |
| 6,195,892 B1 | | 3/2001 | Weems et al. |
| 6,450,774 B1 | | 9/2002 | Erbes et al. |
| 6,463,114 B1 | | 10/2002 | Wivagg |
| 6,490,331 B2 | | 12/2002 | Erbes |
| 6,647,083 B1 | | 11/2003 | Jensen |

FOREIGN PATENT DOCUMENTS

JP    11326586 A    11/1999

* cited by examiner

*Primary Examiner*—Jonathan Johnson
*Assistant Examiner*—Michael Aboagye

(57) ABSTRACT

An apparatus and method for mechanically reinforcing the weld between a riser pipe and riser brace of a jet pump assembly are characterized by first and second attachment members for attachment on a riser brace of the jet pump assembly, and first and second clamp bodies respectively pivotally mounted on the attachment members for movement to a clamping position. In the clamping position, respective abutment surfaces of the clamp bodies are forced against a riser pipe that is attached to a yoke of the riser brace. The abutment surfaces apply radial forces to the riser pipe, and the radial forces are reacted by forces applied against the yoke by respective engagement elements of the attachment members whereby the riser pipe and riser brace are clamped together between the abutment surfaces and the engagement elements.

12 Claims, 6 Drawing Sheets

APPARATUS AND METHOD FOR MECHANICALLY REINFORCING THE WELDS BETWEEN RISER PIPES AND RISER BRACES IN BOILING WATER REACTORS

BACKGROUND OF THE INVENTION

1. Field of the Invention

The present invention relates generally to reinforcing the welds between riser pipes and riser braces in jet pump assemblies of boiling water reactors. In particular, the present invention relates to apparatus and methods for mechanically reinforcing the welds between riser pipes and riser braces by clamping the riser pipes to the riser braces.

2. Discussion of the Related Art

A typical boiling water reactor includes a reactor vessel, a core shroud disposed within the reactor vessel, and a core comprising a plurality of fuel assemblies disposed within the core shroud. An annular region or space between the core shroud and the reactor vessel is known as the downcomer annulus. Feedwater enters the reactor vessel via a feedwater inlet and is distributed circumferentially within the reactor vessel by a feedwater sparger. The feedwater mixes with other water coming from steam separators of the reactor and flows downwardly from the feedwater sparger through the downcomer annulus to enter a lower plenum of the core. Boiling is produced in the core, creating a mixture of water and steam that enters an upper plenum of the core and is directed into steam plenum heads or stand pipes. The mixture of water and steam flows through the stand pipes and enters a plurality of steam separators. The separated liquid water mixes with incoming feedwater and flows down the downcomer annulus to the core. The steam, on the other hand, passes through a dryer and is withdrawn from the reactor vessel via a steam outlet.

Boiling water reactors typically include a coolant recirculation system providing forced convection flow through the core. A portion of the water flowing through the downcomer annulus is withdrawn from the reactor vessel via a recirculation water outlet and is fed under pressure into a plurality of jet pump assemblies distributed about the core shroud within the downcomer annulus. The jet pump assemblies produce a forced convection flow through the core, thusly providing the required reactor core water flow. Boiling water reactors typically include between six and twelve jet pump assemblies with most boiling water reactors having ten jet pump assemblies.

Each jet pump assembly comprises a transition piece, a riser pipe extending downwardly from the transition piece to an elbow connecting the riser pipe to a recirculation inlet nozzle along the reactor vessel wall, and a pair of inlet mixers extending downwardly from the transition piece to a pair of diffusers mounted over holes in a pump deck. The pump deck connects a bottom portion of the shroud with the reactor vessel. The riser pipe is typically cylindrical and tubular and is normally oriented vertically within the downcomer annulus in parallel relation to the wall of the shroud. The riser elbow is tubular and bends outwardly toward the recirculation inlet nozzle. Normally, the outer end of the elbow is connected with a thermal sleeve in the recirculation inlet nozzle. The transition piece extends in opposite lateral directions at the top of the riser pipe to connect with the inlet mixers on opposite sides of the riser pipe. The inlet mixers are oriented vertically in the downcomer annulus in parallel relation to the riser pipe, with lateral support for the inlet mixers provided by respective restrainer brackets attached between the inlet mixers and the riser pipe.

The riser pipe is supported and stabilized within the reactor vessel by a riser brace attached to the riser pipe and to an attachment wall, the attachment wall typically being the reactor vessel wall. Commonly, the riser brace is attached to the riser pipe and to the attachment wall by being welded to the riser pipe and to the attachment wall. The riser brace ordinarily comprises a yoke and side members extending respectively from opposite ends of the yoke in spaced parallel relation. Typically, the yoke has an inwardly curved surface between the side members complementary to the outer curvature of the exterior surface of the riser pipe. The riser brace is disposed in the downcomer annulus with the riser pipe disposed between the side members. The riser brace is normally attached to the riser pipe via a weld between the inwardly curved surface and the exterior surface of the riser pipe. The riser brace is welded to the riser pipe with the side members transverse to the riser pipe and extending from the yoke to respective ends of the side members attached to the attachment wall. The ends of the side members are normally attached to the attachment wall by welding, and the ends of the side members may be welded to intermediary structure, such as braces, blocks or pads, with the intermediary structure being in turn welded to the attachment wall. Typically, each side member of the riser brace comprises an upper leg and a lower leg disposed beneath the upper leg in spaced parallel relation therewith.

The riser brace provides lateral and radial support to the riser pipe. In addition, the riser brace is designed to accommodate the differential thermal expansion resulting from reactor start-up and heat-up, and to accommodate the flow-induced vibration incumbent in the reactor water circulation system due to reactor recirculation pumps. It is important that the natural frequency of the riser brace be greater than the vane passing frequency of the recirculation pumps at any pump speed to avoid the riser brace going into resonance. If the vane passing frequency of the recirculation pumps equals or exceeds the natural frequency of the riser brace, the riser brace will go into resonance and potentially become unstable to the detriment of the jet pump assembly.

Intergranular stress corrosion cracking (IGSCC) resulting from corrosion, radiation and/or stress may occur in the welds between the riser braces and the riser pipes of jet pump assemblies of boiling water reactors. Cracks initiated by IGSCC or other causes in the welds between the riser braces and the riser pipes may grow in size and reach critical sizes for mechanical fatigue resulting from the vane passing frequencies of the recirculation pumps exceeding the excitation frequency of the riser braces.

A clamp apparatus for stiffening a riser brace of a jet pump assembly is disclosed in U.S. Pat. No. 6,647,083 B1 to Jensen. The clamp apparatus is applied to the side members of the riser brace to shorten portions of the side members subject to vibration. The clamp apparatus does not attach to the riser pipe and does not augment the welded connection between the riser brace and the riser pipe.

Various clamps used in jet pump assemblies of boiling water reactors are represented by U.S. Pat. Nos. 6,463,114 B1 to Wivagg, 6,490,331 B2 to Erbes, 6,450,774 B1 to Erbes et al, 6,086,120 and 6,053,652 to Deaver et al, and 6,108,391 to Deaver, and by Japanese Patent Publication No. 11326586A.

The Wivagg patent discloses a clamp used in conjunction with a jacking device to restrain the existing jack screws that are welded about the peripheries of the inlet mixers to provide lateral restraint for the inlet mixers within the restrainer brackets.

The Erbes patent relates to a spring clamp for providing a tight fit between an inlet mixer and a restrainer bracket.

The Erbes et al patent discloses a clamp for being installed on a slip joint coupling an inlet mixer to a diffuser. The clamp is used to squeeze the diffuser to impart an oval deformation to the diffuser.

The Deaver et al patents ('120 and '652) disclose a clamp apparatus for supporting the lower portion of a riser of a jet pump assembly. The clamp apparatus comprises an elbow clamp, a riser clamp and a bridge coupling the elbow and riser clamps. The riser clamp includes a pair of legs for being disposed on opposite sides of the riser pipe and a back portion rigidly connecting the legs in fixed relation.

The Deaver ('391) patent and the Japanese Patent Publication relate to a clamp having upper and lower clamp elements receiving the outer end of a riser elbow therebetween.

Clamp apparatus involved with replacing cracked core spray supply piping in a boiling water reactor are represented by U.S. Pat. Nos. 6,195,892 B1 and 5,839,192 to Weems et al.

U.S. Pat. No. 1,400,801 to Cohen discloses a clamp having opposed jaws movable toward and away from each other along a longitudinal axis of movement. Arms of the jaws extend perpendicular to the axis of movement at a fixed angle.

It can be seen from the above that there is a need for an apparatus and method for mechanically reinforcing the weld between a riser pipe and a riser brace of a jet pump assembly. There is a particular need for a mechanical clamp assembly for mitigating or repairing a cracked weld between a riser brace and riser pipe of a jet pump assembly to maintain structural integrity of the jet pump assembly and to avoid excessive vibration of the riser brace. There is an additional need for a clamp assembly to provide redundant structural support to the weld between a riser pipe and riser brace of a jet pump assembly. Another need exists for a clamp assembly capable of attaching to an existing riser pipe and riser brace of a jet pump assembly while closely matching the footprint of the riser brace. There is also a need for a clamp assembly for applying a compressive load between a riser pipe and the yoke of a riser brace in a jet pump assembly. A need further exists for a clamp assembly providing an alternate load path for loads from a riser pipe to a riser brace and ultimately to the attachment wall to which the riser brace is attached in a boiling water reactor. An additional need exists for a mechanically reinforced weld between a riser pipe and a riser brace of a jet pump assembly wherein the riser brace is clamped to the riser pipe. A need also exists for a method of mechanically reinforcing the weld between a riser pipe and riser brace of a jet pump assembly.

SUMMARY OF THE INVENTION

The present invention overcomes the problems associated with cracked welds between riser pipes and riser braces in jet pump assemblies of boiling water reactors. The present invention provides a repair for a cracked weld between a riser brace and riser pipe of a jet pump assembly in a boiling water reactor involving mechanically clamping the riser pipe to the riser brace. The present invention provides redundant structural support to the weld between a riser pipe and riser brace of a jet pump assembly in a boiling water reactor. The clamp assembly of the present invention applies a compressive load between a riser pipe and the yoke of a riser brace of a jet pump assembly in a boiling water reactor while staying close to the footprint of the riser brace. The present invention provides an alternate load path for loads from a riser pipe to a riser brace and ultimately to the attachment wall to which the riser brace is attached in a boiling water reactor. The present invention ensures that a riser pipe and a riser brace of a jet pump assembly in a boiling water reactor are held together in the event that the weld between the riser pipe and riser brace fails.

Some of the advantages of the present invention are that the clamp assembly can be installed remotely from a refueling bridge using long-handled tooling; the clamp assembly utilizes corrosion resistant materials; the clamp assembly is installed on the riser pipe and riser brace without requiring welding or electric discharge machining; installation of the clamp assembly is simplified through the use of a main bolt or connecting member and a draw bolt or operating member; the connecting member carries compressive loads applied to opposed attachment members of the clamp assembly which attach to the riser brace; a pivotal clamp body is associated with each attachment member to apply radial forces to the riser pipe; the radial load applied by the clamp bodies is adjustable via the operating member which connects the clamp bodies; the attachment members are adjustable via the connecting member which connects the attachment members; the attachment members include respective retaining members for respectively engaging the side members of the riser brace to constrain the riser brace against movement; the attachment members include engagement elements or shear tabs along the yoke of the riser brace to react the radial forces applied by the clamp bodies; the clamp assembly avoids interfering with the jet pump mixers and/or other internals or equipment installed in the reactor vessel for future repairs or inspections; and the clamp assembly and method of the present invention allow cracked welds between the riser pipes and riser braces of jet pump assemblies to be repaired rather than replaced, thereby avoiding the disadvantages of replacement including greater cost, longer down times and the potential for radiation exposure.

These and other aspects, advantages and benefits are realized with the present invention as generally characterized in a clamp assembly for clamping a riser brace to a riser pipe of a jet pump assembly in which the riser pipe has a central longitudinal axis and the riser brace has first and second side members extending from a yoke attached to the riser pipe with the side members extending transverse to the central longitudinal axis of the riser pipe on opposite sides of the riser pipe. The clamp assembly comprises first and second clamp members pivotally mountable on the riser brace respectively on the opposite sides of the riser pipe, first and second engagement elements respectively connected to the clamp members, and an operating member coupling the clamp members in spaced relation along a clamping axis. Each clamp member includes a clamp body comprising a coupling portion, a lever arm portion, an abutment surface on the lever arm portion for being disposed along the riser pipe opposite the yoke, and a pivot between the coupling and lever arm portions defining a pivot axis about which the clamp body is pivotal on the riser brace. The pivot axes for the clamp members are parallel and are perpendicular to the clamping axis. The engagement elements are respectively securable on the riser brace with the yoke of the riser brace disposed between the riser pipe and the engagement elements. The operating member couples the coupling portions of the clamp bodies in spaced relation along the clamping axis. The operating member is operable to move the coupling portions further away from one another along the clamping axis to effect pivotal movement of the clamp bodies in opposite directions about the pivot axes to force the abutment surfaces against the riser pipe at respective first and second radial locations. The clamp bodies apply radial forces to the riser pipe via the abutment surfaces at the radial locations and these forces are reacted by forces applied by the engagement elements to the yoke. The engagement elements apply the forces to the yoke in parallel directions transverse to the central longitudinal axis of the riser pipe. The forces applied by the engagement elements are also transverse to the clamping axis.

The present invention is further characterized in a mechanically reinforced weld between a riser pipe and a riser brace of a jet pump assembly in a boiling water reactor comprising a jet pump assembly including a riser pipe and a riser brace welded to the riser pipe, and a clamp assembly clamping the riser brace to the riser pipe. The riser pipe has a central longitudinal axis, and the riser brace comprises a yoke and first and second side members extending from the yoke in spaced relation. The riser pipe is disposed between the side members with the yoke transverse to the central longitudinal axis and the side members extending on opposite sides of the riser pipe. The riser brace has a periphery including an outer peripheral portion and an inner peripheral portion. The yoke has an outer surface along the outer peripheral portion and an inner surface between the side members along the inner peripheral portion, the inner surface being welded to the riser pipe. The clamp assembly comprises first and second attachment members attached to the riser brace and having respective engagement elements in contact with the outer surface of the yoke, first and second clamp bodies respectively pivotally mounted on the attachment members and an operating member pivoting the clamp bodies into engagement with the riser pipe at first and second radial locations. The clamp bodies apply radial forces to the riser pipe at the radial locations in the direction of the central longitudinal axis of the riser pipe and the engagement elements react the radial forces to clamp the riser pipe to the yoke.

The present invention is also generally characterized in a method of mechanically reinforcing the weld between a riser pipe and a riser brace of a jet pump assembly in a boiling water reactor in which the jet pump assembly includes a riser pipe having a central longitudinal axis, a riser brace having a yoke transverse to the riser pipe and first and second side members extending from the yoke in spaced relation on opposite sides of the riser pipe, and a weld securing the riser pipe to the yoke with the riser pipe disposed between the side members. The method comprises the steps of attaching first and second attachment members of a clamp assembly to the riser brace with respective first and second engagement elements of the attachment members located along the yoke with the yoke disposed between the riser pipe and the engagement elements, pivoting first and second clamp bodies of the clamp assembly respectively mounted on the attachment members about respective pivot axes to obtain a clamping position in which the clamp bodies are forced against the riser pipe at respective first and second radial locations opposite the yoke and apply radial forces to the riser pipe at the first and second radial locations in the direction of the central longitudinal axis, reacting the radial forces with forces applied by the engagement elements to the yoke such that the clamp assembly clamps the riser pipe to the riser brace, and leaving the clamp assembly in place to mechanically reinforce the weld.

Other aspects, benefits and advantages of the present invention will become apparent from the following description of the preferred embodiments taken in conjunction with the accompanying drawings wherein like parts in each of the several figures are identified by the same reference characters.

DESCRIPTION OF THE PREFERRED EMBODIMENTS

Figure 1:
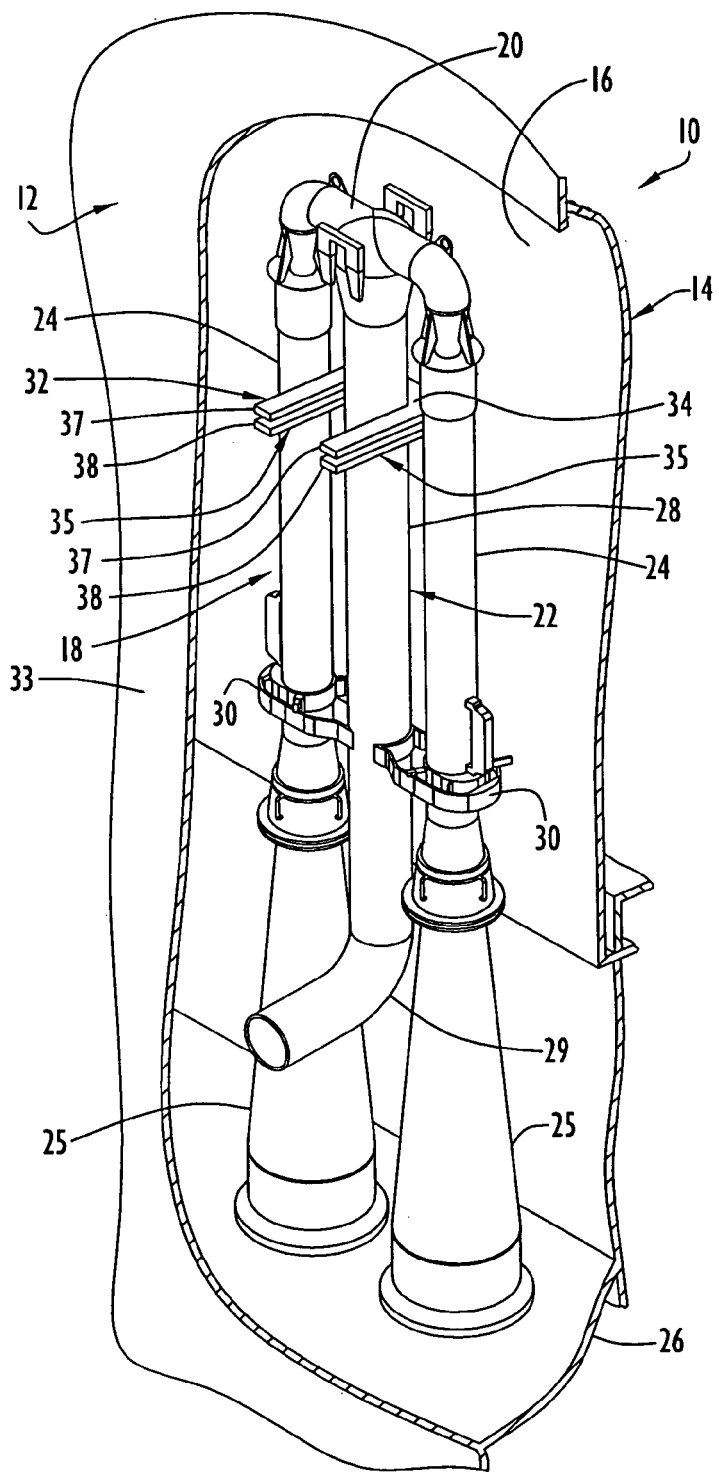
FIG. 1 is a broken perspective view depicting a jet pump assembly in a boiling water reactor.
Figure 2:
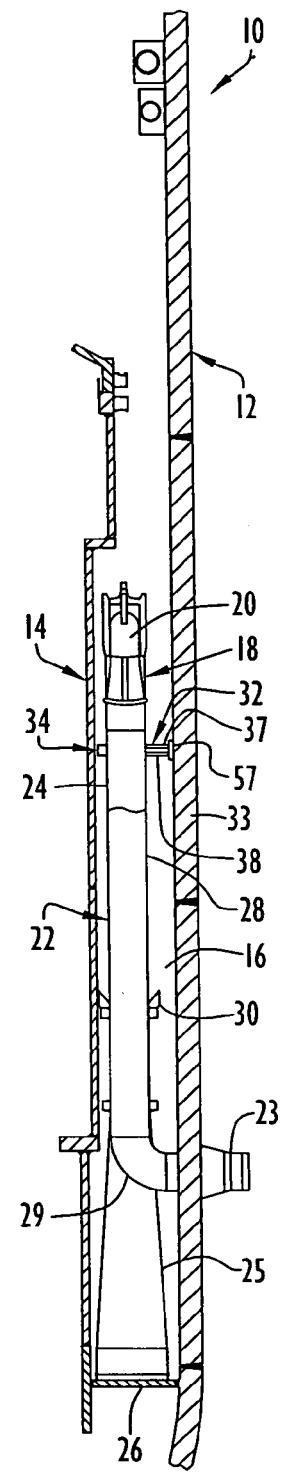
FIG. 2 is a broken side view, partly in section, illustrating the jet pump assembly between the reactor pressure vessel and the core shroud of the boiling water reactor.
Figure 3:
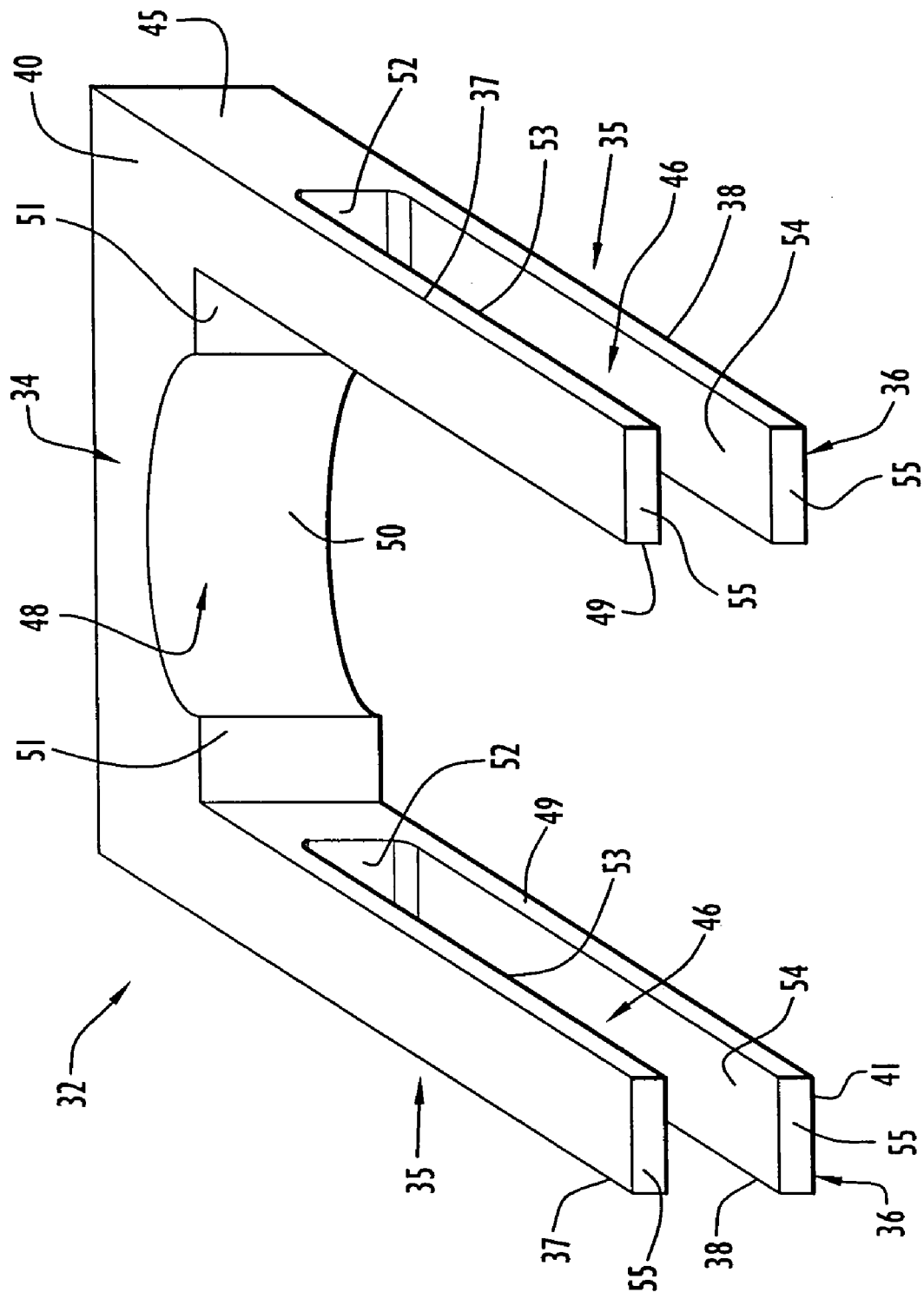
FIG. 3 is a perspective view of a riser brace of the jet pump assembly.

A boiling water reactor 10 is illustrated in FIGS. 1 and 2 and comprises a reactor pressure vessel 12 and a core shroud 14 disposed within the reactor pressure vessel 12 with there being an annular region or space 16 known as the downcomer annulus between the core shroud and the reactor pressure vessel. A jet pump assembly 18 of the boiling water reactor 10 is disposed in the annular region 16 between the reactor pressure vessel 12 and the core shroud 14. A more detailed explanation of the structure and operation of boiling water reactor 10 is found in U.S. Pat. No. 6,264,203 B1 to Weems et al, the entire disclosure of which is incorporated herein by reference.

The jet pump assembly 18 comprises a transition piece 20, a riser 22 extending downwardly from the transition piece to a recirculation inlet nozzle 23 along the exterior of the reactor pressure vessel wall, and a pair of inlet mixers 24 extending downwardly from the transition piece to a pair of diffusers 25 mounted over holes in a pump deck 26 connecting a bottom portion of the shroud 14 with the reactor pressure vessel 12. The riser 22 includes a tubular riser pipe 28 extending vertically downwardly within the annular region 16 in parallel relation to the wall of shroud 14, and a tubular riser elbow 29 extending downwardly from the bottom of the riser pipe and bending outwardly toward the recirculation inlet nozzle 23. The riser pipe 28 is ordinarily cylindrical and tubular with a longitudinally straight configuration between transition piece 20 and elbow 29. The outer end of the elbow 29 may be connected with a thermal sleeve in the recirculation inlet nozzle 23. The riser pipe 28 and/or the riser elbow 29 may each be formed as one or more sections connected such as by welding. The transition piece 20 extends in opposite lateral directions at a top of the riser pipe 28 to connect with the inlet mixers 24 on opposite sides of the riser pipe. The inlet mixers 24 are oriented vertically in the annular region 16 in parallel relation to the riser pipe 28. Lateral support for the inlet mixers 24 is provided by restrainer brackets 30 respectively attached between the inlet mixers 24 and the riser pipe 28.

The riser pipe 28 is supported and stabilized within the annular region 16 by a riser brace 32 welded to the riser pipe 28 and connected to an attachment wall 33 of the boiling water reactor 10. As shown in FIG. 2, the attachment wall 33 may be the wall of the reactor pressure vessel 12. The riser brace 32 is depicted in FIGS. 1–7 and has a generally U-shaped configuration comprising a yoke 34 and first and second side members 35 extending in the same direction from opposite ends of the yoke 34 in spaced parallel relation to terminate at respective side member ends 36. The periphery or footprint of the riser brace 32 in plan view may be considered as comprising an outer peripheral portion of generally U-shaped configuration, an inner peripheral portion of generally U-shaped configuration within the outer peripheral portion, and end peripheral portions connecting the outer and inner peripheral portions at the ends 36, respectively. Each side member 35 is bifurcated to present a planar upper or first leg 37 and a planar lower or second leg 38 disposed beneath the upper leg 37 in spaced parallel relation therewith. The upper legs 37 are coplanar, and the lower legs 38 are coplanar. The riser brace 32 has an upper face 40 which is planar, and a lower face 41 which is planar and parallel to upper face 40. The upper face 40 defines a top surface of yoke 34 and top surfaces of the upper legs 37. The lower face 41 defines a bottom surface of yoke 34 and bottom surfaces of the lower legs 38.

The riser brace 32 has an outer base face 44 and first and second outer lateral faces 45 connecting the upper and lower faces 40 and 41 along the outer peripheral portion of the riser brace. The outer base face 44 is planar and perpendicular to the upper and lower faces 40 and 41. The outer base face 44 extends from one outer lateral face 45 to the other and defines an outer surface of yoke 34 along the outer peripheral portion of the riser brace 32. The first and second outer lateral faces 45 are planar and parallel, and respectively extend from the outer base face 44 to the ends 36. The outer lateral faces 45 are perpendicular to the upper and lower faces 40 and 41 and are perpendicular to the outer base face 44. Each outer lateral face 45 defines outer side surfaces of the corresponding legs 37 and 38 along the outer peripheral portion of riser base 32. The legs 37, 38 of each side member 35 are aligned in spaced parallel relation along the corresponding outer lateral face 45. Each outer lateral face 45 presents an opening corresponding to the space 46 between the corresponding legs 37 and 38.

The riser brace 32 has an inner base face 48 and first and second inner lateral faces 49 connecting the upper and lower faces 40 and 41 along the inner peripheral portion of the riser brace. The inner base face 48 extends from one inner lateral face 49 to the other and defines an inner surface of yoke 34 along the inner peripheral portion of the riser brace 32. The inner base face 48, i.e. the inner surface of yoke 34, comprises an arcuate inner surface segment 50 between the inner lateral faces 49. The inner base face 48, i.e. the inner surface of yoke 34, may comprise planar inner surface segments 51 on opposite sides of the arcuate inner surface segment 50 by which the arcuate inner surface segment is connected to the inner lateral faces 49, respectively. The planar inner surface segments 51 may be parallel to the outer base face 44 and perpendicular to the inner lateral faces 49. The arcuate inner surface segment 50 has an inward or concave curvature complementary to the outward or convex exterior curvature of the riser pipe 28, and thusly defines a recess in yoke 34 for accommodating a circumferential portion of the riser pipe with a close fit. The first and second inner lateral faces 49 are planar and parallel and respectively extend from the inner base face 48 to the ends 36. The inner lateral faces 49 are parallel to the outer lateral faces 45, and each side member 35 has a width between its outer and inner lateral faces. Each inner lateral face 49 defines inner side surfaces of the corresponding legs 37 and 38 along the inner peripheral portion of the riser brace 32. Each inner lateral face 49 presents an opening corresponding to the space 46 between the corresponding legs 37 and 38.

The first and second side members 35 are essentially identical to one another, with the upper and lower legs 37 and 38 of each side member 35 extending from an end wall 52 of the side member to the corresponding side member end 36. The upper leg 37 of each side member 35 has its top surface defined by the upper face 40 and has a bottom surface 53 that is planar and parallel to its top surface. The upper legs 37 have a thickness between their top and bottom surfaces. The lower leg 38 of each side member 35 has its bottom surface defined by the lower face 41 and has a top surface 54 that is planar and parallel to its bottom surface. The plane of bottom surfaces 53 is spaced from the plane of top surfaces 54 by the space 46. The end wall 52 of each side member 35 may be parallel to the outer base face 44 with the bottom surface 53 of the upper leg 37 and the top surface 54 of the lower leg 38 joined to the end wall at radiused corners. The legs 37 and 38 of each side member 35 have planar outer side surfaces along the plane of outer lateral face 45 and have planar inner side surfaces along the plane of inner lateral face 49. The perpendicular distance or spacing between the planes of inner lateral faces 49 is of a size to accommodate the outer diameter of the riser pipe 28, preferably with a close fit.

Each leg 37 and 38 is of uniform width and uniform height or thickness from the corresponding end wall 52 to the corresponding side member end 36. The top and bottom surfaces of each leg 37 and 38 extend from the corresponding outer lateral face 45 to the corresponding inner lateral face 49. Accordingly, the top and bottom surfaces of each leg 37 and 38 are connected by the outer side surface of the leg along the outer peripheral portion of the riser brace 32 and are connected along the inner peripheral portion of the riser brace by the inner side surface of the leg. Each leg 37 and 38 has an end surface 55 at the corresponding side member end 36. The end surface 55 for each leg 37 and 38 connects the top and bottom surfaces of the corresponding leg and also connects the outer and inner side surfaces of the corresponding leg. The end surfaces 55 are depicted as being co-planar and parallel to the outer base face 44.

Figure 4:
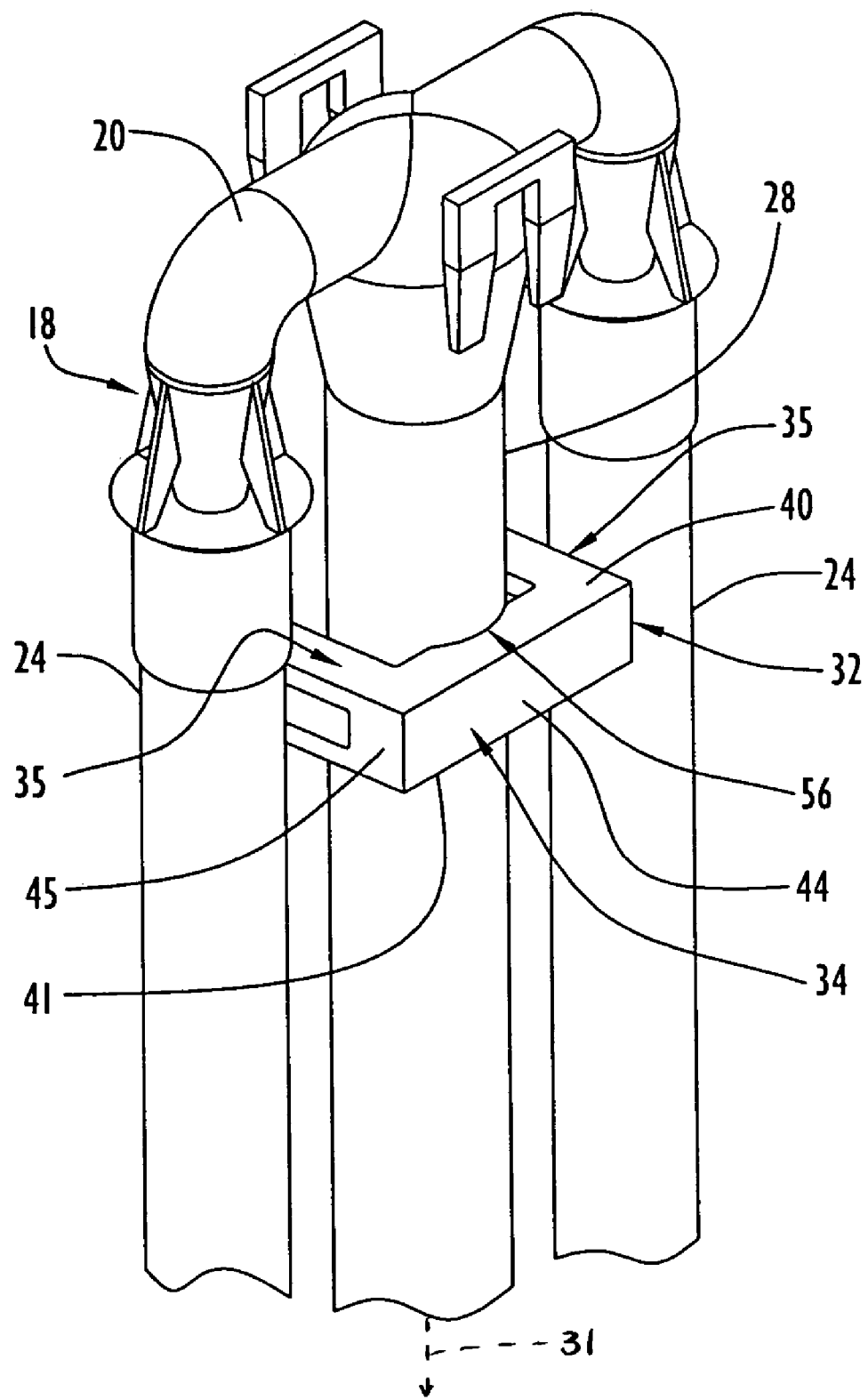
FIG. 4 is a broken perspective view of the jet pump assembly depicting a weld between a riser pipe and the riser brace of the jet pump assembly.

As shown in FIGS. 1, 2 and 4, the riser brace 32 is disposed in the annular region 16 and positioned on the riser pipe 28 with a central longitudinal axis 31 of the riser pipe extending vertically between the side members 35. The upper face 40 of the riser brace 32 faces upwardly toward the top of the reactor pressure vessel 12, and the lower face 41 of the riser brace faces downwardly toward the bottom of the reactor pressure vessel. However, it should be appreciated that the riser brace 32 can be inverted, with the lower face 41 serving as the upper face and the upper face 40 serving as the lower face. The yoke 34 fits between the riser pipe 28 and the core shroud 14 and extends transverse or perpendicular to the central longitudinal axis 31 of the riser pipe. The side members 35 extend from the yoke 34 on opposite sides of the riser pipe 28 and are transverse or perpendicular to the central longitudinal axis 31 of the riser pipe. The side members 35 fit between the riser pipe 28 and the inlet mixers 24, respectively, and extend toward the wall of the reactor pressure vessel 12, which forms the attachment wall 33 for the riser brace 32. The riser brace 32 is positioned on the riser pipe 28 so that a circumferential portion of the riser pipe is accommodated with a close fit in the recess defined by the arcuate inner surface segment 50. The arcuate inner surface segment 50 is placed as close as practicable to the exterior surface of the riser pipe 28, and the riser brace 32 is secured to the riser pipe 28 via a weld 56 along the junction between the exterior surface of the riser pipe and the arcuate inner surface segment 50 of the yoke 34 as indicated in FIG. 4. As shown in FIG. 2, the side members 35 are of sufficient length for ends 36 to be secured to the attachment wall 33. FIG. 2 illustrates a typical situation where the ends 36 of the side members 35 are welded to pads 57 that are in turn welded to the interior surface of the wall of reactor pressure vessel 12. A pad 57 may be provided for each side member 35, with the end 36 of the side member being secured to the pad via welds along the junctions between the pad and the end surfaces 55 of the legs 37 and 38.

When the riser brace 32 is secured to the riser pipe 28 and to the reactor pressure vessel 12 as described above, the riser pipe is constrained by the yoke 34 from moving in a radial direction away from the reactor pressure vessel 12 while the weld 56 resists movement of the riser pipe in a radial direction toward the reactor pressure vessel. Movement of the riser pipe 28 laterally and vertically is resisted by weld 56, and the side members 35 of the riser brace 32 constrain the riser pipe laterally. When the weld 56 between the riser pipe 28 and the riser brace 32 is compromised, such as from intergranular stress corrosion cracking (IGSCC), the load path for loads from the riser pipe to the riser brace and ultimately to the reactor pressure vessel 12 may be compromised and the ability of the riser brace to constrain movement of the riser pipe may also be compromised. In addition, cracking of the weld 56 may allow the natural vibration frequency of the riser brace 32 to become equal to or less than the vane passing frequency of the reactor recirculation pumps such that the riser brace will go into resonance, potentially causing the riser 22 to become unstable.

The present invention involves mechanically clamping the riser brace 32 to the riser pipe 28 to provide structural support to the weld 56 and to provide an alternate load path for loads from the riser pipe to the riser brace and ultimately to the attachment wall to which the riser brace is attached. The present invention may be employed to mechanically reinforce the weld between the riser pipe and the riser brace and may be employed as a repair for a cracked weld between the riser pipe and riser brace so that the adverse consequences associated with a cracked weld can be avoided.

Figure 5:
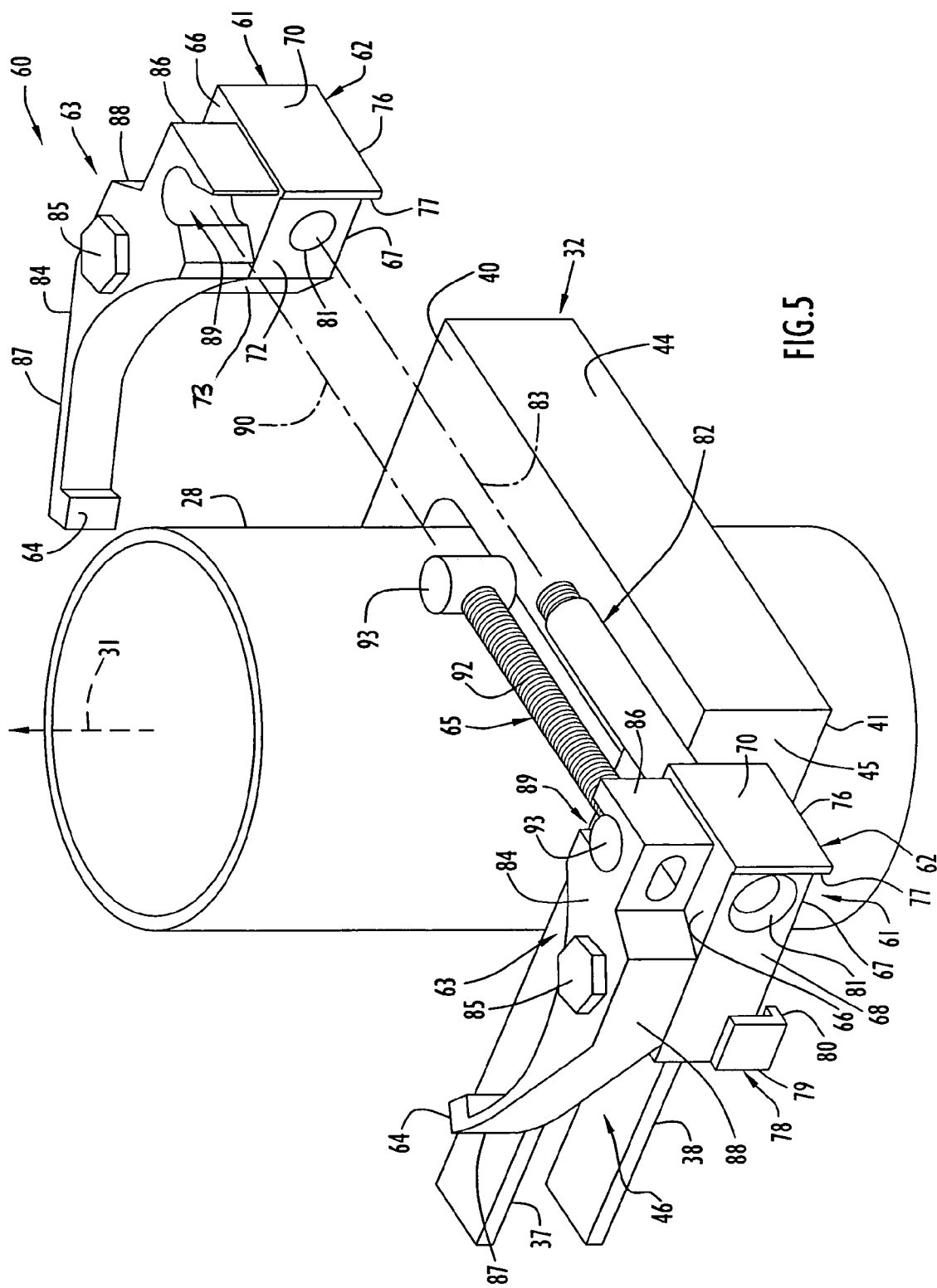
FIG. 5 is a broken perspective view of the riser pipe depicting a clamp assembly according to the present invention in a disassembled condition prior to being attached to the riser brace that is welded to the riser pipe.
Figure 6:
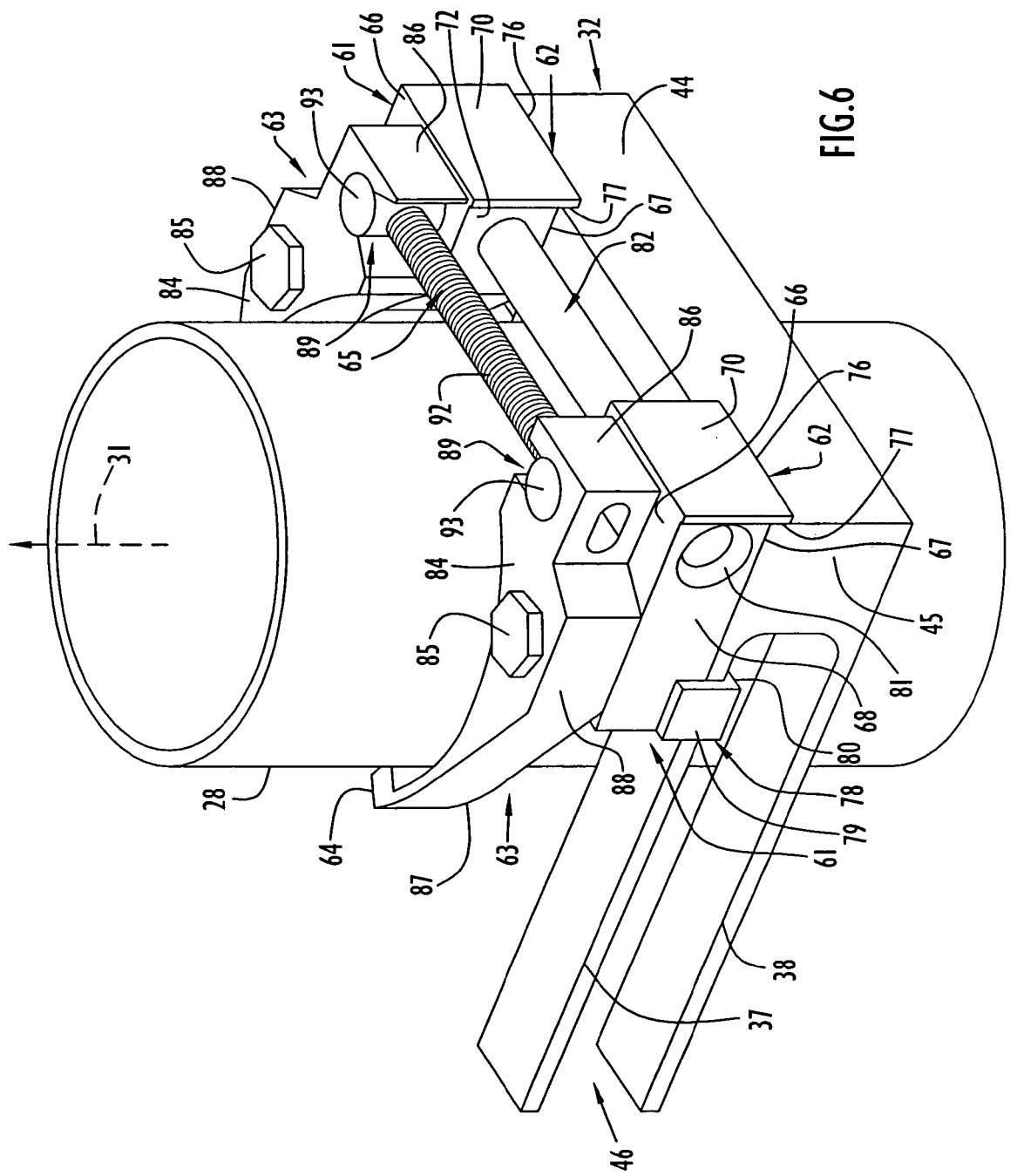
FIG. 6 is a broken perspective view of the riser pipe illustrating the clamp assembly in an assembled condition attached to the riser brace and in a clamping position clamping the riser pipe to the riser brace to mechanically reinforce the weld between the riser pipe and the riser brace.
Figure 7:
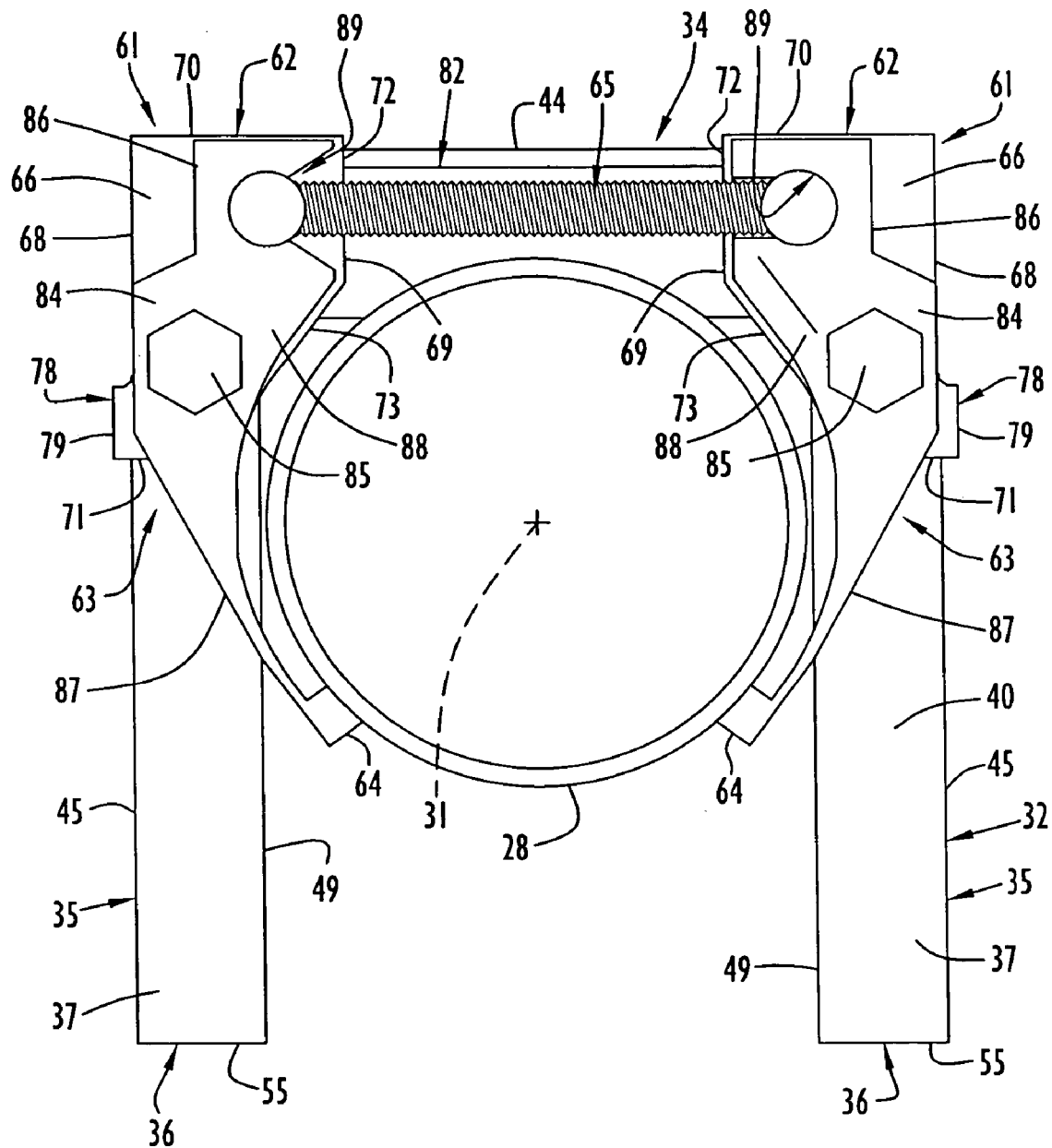
FIG. 7 is a top view of the clamp assembly in the assembled condition attached to the riser brace and in the clamping position clamping the riser pipe to the riser brace.

A clamp assembly 60 according to the present invention is illustrated in FIGS. 5–7, which depict riser pipe 28 and riser brace 32 welded to the riser pipe as described above. The clamp assembly 60 includes first and second attachment members 61 for attachment to the riser brace 32, an engagement element 62 for each attachment member, first and second clamp members 63 respectively associated with the attachment members, an abutment surface 64 for each clamp member, and an operating member 65 for moving clamp bodies of the clamp members to obtain a clamping position in which the riser pipe 28 and the riser brace 32 are clamped together between the engagement elements 62 and the abutment surfaces 64.

The first and second attachment members 61 are essentially the same and are essentially mirror images of one another. Each attachment member 61 has a top surface 66, a bottom surface 67, an outer side surface 68, an inner side surface 69, a rearward end surface 70 and a forward end surface 71. The top and bottom surfaces 66 and 67 are planar and are parallel to one another. The outer side surface 68 connects the top and bottom surfaces 66 and 67 and is planar and perpendicular to the top and bottom surfaces 66 and 67. The inner side surface 69 connects the top and bottom surfaces 66 and 67 and comprises a rearward inner side surface segment 72 parallel to the outer side surface 68, and a forward inner side surface segment 73 extending forwardly at an angle from the rearward inner side surface segment 72 to the forward end surface 71. The rearward inner side surface segment 72 is perpendicular to the top and bottom surfaces 66 and 67. The forward inner side surface segment 73 is perpendicular to the top and bottom surfaces 66 and 67 and is angled from the rearward inner side surface segment 72 in the direction of the outer side surface 68. The angle of the forward inner side surface segment 73 ensures that only an insignificant amount of the space demarcated by the inner peripheral portion of the riser brace 32 is obstructed by the attachment member 61 at an inside corner of the riser brace when the clamp assembly 60 is attached thereto. The rearward end surface 70 is planar while being perpendicular to the top and bottom surfaces 66 and 67, to the outer side surface 68 and to the rearward inner side surface segment 72. The forward end surface 71 is planar and parallel to the rearward end surface 70. The forward end surface 71 connects the top and bottom surfaces 66 and 67 as well as the outer and inner side surfaces 68 and 69.

The engagement element 62 for each attachment member 61 comprises a planar shear tab depending from the bottom surface 67 and formed as an extension of the rearward end surface 70. The rearward end surface 70 for each attachment member 61 extends downwardly from the top surface 66 to a lower edge 76 of the engagement element 62 spaced below the plane of bottom surface 67. Accordingly, the rearward end surface 70 defines the rearward surface of the engagement element 62. Each engagement element 62 has a forward surface 77 extending from the bottom surface 67 to the lower edge 76, with the forward surface 77 being parallel to the rearward end surface 70 and perpendicular to the bottom surface 67. The engagement element 62 has a thickness between the rearward end surface 70 and the forward surface 77, and preferably the thickness of the engagement element is minimized while retaining sufficient structural strength so that the attachment member 61 remains close to the outer peripheral portion of the riser brace 32 when the clamp assembly 60 is attached thereto. The engagement element 62 has a length in a direction perpendicular to outer side surface 68, and preferably the length of the engagement element is greater than the width of the side members 35 of riser brace 32.

Each attachment member 61 has a retaining member 78 comprising an angled finger, preferably of L-shaped configuration, having a vertical or first retaining wall 79 and a horizontal or second retaining wall 80 perpendicular to the vertical retaining wall 79. The retaining walls 79 and 80 may be planar as shown for the illustrated embodiment. An upper portion of the vertical retaining wall 79 is secured in overlapping relation on the outer side surface 68 of the attachment member 61 with a lower portion of the vertical retaining wall 79 extending below the bottom surface 67 of the attachment member. The horizontal retaining wall 80 extends from the bottom of the vertical retaining wall 79 perpendicularly or at a right angle to the vertical retaining wall, with the horizontal retaining wall extending toward or in the direction of the plane of the rearward inner side surface segment 72. The horizontal retaining wall 80 is spaced from and parallel to the bottom surface 67 of the attachment member 61, with there being a recess defined between the planar bottom surface 67 and a planar top surface of the horizontal retaining wall 80. The size of this recess in a direction perpendicular to the bottom surface 67 is designed to receive the thickness of a corresponding upper leg 37 of the riser brace 32 with a close fit as explained further below. Preferably, the retaining member 78 is located on the attachment member 61 with a front edge of the retaining member aligned with the plane of the forward end surface 71 of the attachment member. The thickness of the vertical retaining wall 79 is preferably minimized while retaining sufficient structural strength so that the retaining member 78 remains close to the outer peripheral portion of the riser brace 32 when the clamp assembly 60 is attached to the riser brace as explained further below.

Each attachment member 61 has a bore 81 therein with a central longitudinal axis coaxial with a connecting axis 83 perpendicular to the vertical retaining wall 79 of the retaining member 78. Each bore 81 has an opening along the rearward inner side surface segment 72 of the attachment member 61, and the bore 81 may extend entirely through the attachment member as shown in FIG. 5 for the left attachment member. A connecting member 82 has opposing ends for engagement in the bores 81 to connect the first and second attachment members 61 in spaced relation along the connecting axis 83. The connecting member 82 is operable to adjust the spaced relation of the attachment members 61 via movement of one or both attachment members toward and away from the other along the connecting axis 83. The connecting member 82 may comprise a main bolt having externally threaded opposing ends, and the bores 81 may be threaded to threadedly engage the ends of the connecting member. During installation of the clamp assembly 60 on the riser brace 32, a first end of the connecting member 82 is captured in the bore 81 of one of the attachment members 61 while being rotatable within the capturing bore to allow the second end of the connecting member 82 to be threadedly advanced into the bore 81 of the other attachment member 61. Threaded advancement of the connecting member 82 into the other attachment member 61 while the attachment members 61 are held via an installation tool causes relative movement between the attachment members along the connecting axis 83 whereby the attachment members 61 are drawn closer together. Depending on the manner in which the first end of the connecting member 82 is captured in its bore 81, one attachment member 61 may move individually toward the other or both attachment members 61 may move in unison toward the other. Installation of the clamp assembly 60 on the riser brace 32 is explained in greater detail below.

Each clamp member 63 is mounted on the riser brace 32 via the corresponding attachment member 61, which also provides a structural connection between the clamp member and the corresponding engagement element 62. Each clamp member 63 comprises a clamp body 84 and a pivot 85 pivotally mounting the clamp body on the top surface 66 of the corresponding attachment member 61. The clamp bodies 84 are mirror images of one another and are essentially the same, except for differences in the configuration of respective cavities in the clamp bodies for receiving the ends of the operating member 65 as explained further below. Each clamp body 84 includes a coupling portion 86, a lever arm portion 87 and a pivot or fulcrum portion 88 between the coupling portion 86 and the lever arm portion 87. The clamp bodies 84 each have a planar lower surface in overlapping arrangement upon the top surface 66 of the corresponding attachment member 61, and the clamp bodies may each have a planar upper surface parallel to the lower surface thereof. As best seen in FIG. 5, the coupling portions 86 have respective cavities 89 therein, each cavity 89 having a first cavity section for securing a key of operating member 65 and a second cavity section, perpendicular to the first cavity section, for accommodating an extension member or draw bolt of the operating member as explained further below. The first cavity section may extend vertically in the coupling portion 86, with a central longitudinal axis of the first cavity section perpendicular to the connecting axis 83 and to the top surface 66 of the corresponding attachment member 61. The first cavity sections are configured to receive the keys carried on opposing ends of the extension member of the operating member 65 as explained further below.

Each cavity 89 has its second cavity section in communication with its first cavity section, the second cavity section being aligned with a clamping axis 90 that is perpendicular to a pivot axis defined by pivot 85 and parallel to the connecting axis 83 of the attachment members 61. Each second cavity section extends from its first cavity section to a cavity opening along an exterior inner face of the coupling portion 86, and these cavity openings face one another along the clamping axis 90 when the attachment members 61 are connected via the connecting member 82. The second cavity sections may extend entirely through the coupling portions 86 in the direction of the clamping axis 90 as seen in FIG. 5 for the left clamp member 63. The first cavity sections and/or the second cavity sections may extend entirely through the coupling portions 86 in a direction perpendicular to the clamping axis 90.

One clamp body 84 has its cavity 89 designed as a capturing cavity having a configuration to capture a key of the operating member 65 in the first cavity section of the capturing cavity so that the captured key cannot move relative to the clamp body along the clamping axis 90. The second cavity section of the capturing cavity 89 is not large enough in size for the captured key to move into the second cavity section from the first cavity section but is large enough in size to accommodate the extension member of the operating member 65. The cavity 89 of the other clamp body 84 is designed to allow the other key of the operating member 65 to be inserted into its first cavity section through its second cavity section. Accordingly, the second cavity section of this cavity 89 is large enough in size for the key to be introduced into the second cavity section via its cavity opening and moved within the second cavity section until the key is received in the first cavity section. To facilitate introduction of the key into the second cavity section via its cavity opening, the second cavity section may have a flared configuration adjacent the cavity opening.

The pivots 85 extend vertically through the respective pivot portions 88, with central longitudinal axes of the pivots 85 defining respective pivot axes perpendicular to the clamping axis 90. When clamp assembly 60 is attached to the riser brace 32, the pivot axes extend in the same direction as or are parallel to the central longitudinal axis 31 of the riser pipe 28. The clamp bodies 84 are pivotable or rotatable about their pivots 85 relative to the corresponding attachment members 61 between clamping and non-clamping positions as explained further below. Each pivot 85 may comprise a pivot bolt extending vertically through the pivot portion 88 and into the corresponding attachment member 61 such that the pivot 85 establishes a fulcrum for the clamp body 84. However, the pivots 85 may comprise any other suitable structure or devices allowing the lever arm portions 87 to pivot or rotate between the clamping and non-clamping positions. The pivots 85 may be respectively disposed close to the forward end surfaces 71 of the attachment members 61, and the pivots 85 may be respectively disposed in alignment over the side members 35 of the riser brace 32 when the attachment members 61 are attached to the riser brace.

The lever arm portions 87 are angled from the respective pivot portions 88 and extend forwardly beyond the forward end surfaces 71 of the corresponding attachment members 61. Each lever arm portion 87 extends forwardly from the pivot portion 88 to a forward end carrying the abutment surface 64. Each lever arm portion 87 is of decreasing width from the pivot portion 88 to the abutment surface 64. Each clamp body 84 has an arcuate inside surface extending from the exterior inner face of the coupling portion 86 to the abutment surface 64. The arcuate inside surface of the clamp body 84 defines the inside surface of the lever arm portion 87 and, therefore, the lever arm portion 87 is curved along its inside surface. The arcuate inside surface of the clamp body 84 has a curvature which may be the same or similar to the external circumferential curvature of the riser pipe 28 such that the inside surface of the clamp body 84 may follow or substantially follow the riser pipe external circumference when the clamp assembly 60 is deployed on the riser brace 32 as seen in FIG. 7. As shown in FIG. 7, the inside surfaces of the lever arm portions 87 are spaced from the external circumference of the riser pipe 28 in a radial direction, and the abutment surfaces 64 are defined by respective protrusions extending inwardly in a radial direction from the inside surfaces of the lever arm portions 87. Each protrusion 64 extends inwardly from the inside surface of its lever arm portion 87 to the abutment surface 64, which may have a slightly convex curvature.

The operating member 65 comprises the extension member 92 and the keys 93 at opposing ends of the extension member. The extension member 92 may comprise an externally threaded draw bolt, the ends of which are threadedly received in the keys 93. The keys 93 may each have a cylindrical external configuration with a central longitudinal axis, and a threaded bore perpendicular to the central longitudinal axis of the key threadedly receiving the end of the extension member 92 in coaxial relation. Accordingly, each key 93 is oriented perpendicular to the extension member 92, with the central longitudinal axes of the keys 93 perpendicular to the central longitudinal axis of the extension member 92. The central longitudinal axis of the extension member 92 is coaxial with and defines the clamping axis 90.

One of the keys 93 is received and captured in the first cavity section of the capturing cavity 89, the left cavity 89 in FIGS. 5 and 6 and the right cavity 89 in FIG. 7 being the capturing cavity. Accordingly, the first cavity section of the capturing cavity 89 has a size and configuration to receive or mate with the external configuration of the key 93, and the second cavity section of the capturing cavity 89 has a size and configuration to accommodate the extension member 92 extending from the captured key 93 while preventing the captured key 93 from moving from the first cavity section in the direction of the clamping axis 90. The key 93 may be introduced in the first cavity section of the capturing cavity 89 by being aligned over the top of the first cavity section and moved downwardly into the first cavity section until the bottom of the key rests upon the top surface 66 of the corresponding attachment member 61. The opposite key 93 is positioned in the first cavity section of the other cavity 89, and this key 93 may be positioned in the first cavity section of the other cavity 89 by being introduced in and moved along the second cavity section of the other cavity until the key 93 mates with or is received in the first cavity section.

When the keys 93 are respectively positioned in the first cavity sections of cavities 89 with the extension member 92 extending therebetween, the clamp bodies 84 are coupled in spaced relation along the clamping axis 90. The extension member 92 is rotatable to extend or increase the separation distance between the coupling portions 86 of the clamp bodies 84 along the clamping axis 90 by moving the coupling portions 86 relative to the attachment members 61 and away from one another along the clamping axis 90. Movement of the coupling portions 86 relative to the attachment members 61 and away from one another along the clamping axis 90 is accomplished in response to rotation of the extension member 92 about its central longitudinal axis, i.e. the clamping axis 90, since the keys 93 are prevented by the cavities 89 from rotating when the extension member 92 is rotated. As the extension member 92 is rotated about its central longitudinal axis with the keys 93 respectively held in place in the cavities 89, the keys 93 are moved in opposition away from one another along the extension member 92 and bear against the coupling portions 86 to correspondingly move the coupling portions 86 away from one another relative to the attachment members 61 as permitted due to pivots 85. As the coupling portions 86 are extended away from one another by the extension member 92, the lever arm portions 87 are caused to pivot in unison and in opposite directions toward one another about their pivots 85, causing movement of abutment surfaces 64 in a radial inward direction. Looking at FIG. 7, the lever arm portion 87 on the left pivots in a counterclockwise direction about its pivot 85 and the lever arm portion 87 on the right pivots in a clockwise direction about its pivot 85.

The clamp assembly 60 may be made of any suitable materials to withstand the necessary forces thereon as well as the expected environmental conditions in a boiling water reactor and is preferably made of corrosion resistant materials. The clamp assembly 60 can be installed on the riser brace 32 remotely from the refueling bridge of the boiling water reactor using a long-handled installation tool (not shown). The installation tool may releasably grasp the clamp assembly by releasably engaging any suitable holes, slots, bores, cavities, recesses and/or protrusions on the attachment members 61, the clamp members 63 and/or any other components of the clamp assembly. Initially, one end of the connecting member 82 is captured in the capturing bore 81 of the capturing attachment member 61. One key 93 of the operating member 65 is captured in the first or vertical cavity section of the capturing cavity 89 of the capturing clamp member 63, and the capturing clamp member 63 is preferably the clamp member associated with the capturing attachment member 61. In FIG. 5, the left attachment member 61 is the capturing attachment member capturing the end of connecting member 82 and the left clamp member 63 is the capturing clamp member capturing one key 93 of operating member 65. The opposite end of the connecting member 82 is threaded into the bore 81 of the opposite attachment member 61 an amount sufficient to allow the attachment members 61 to be loosely positioned on the riser brace 32 by the installation tool. The attachment members 61 and corresponding clamp members 63 are positioned on the riser brace 32 on the opposite sides of the riser pipe 28 along which the side members 35 extend. The bottom surfaces 67 of the attachment members 61 are positioned upon the upper face 40 of the riser brace and the engagement elements 62 are positioned adjacent the outer base face 44 of the riser brace such that the yoke 34 is disposed between the riser pipe 28 and the engagement elements 62. The first walls 79 of the retaining members 78 are respectively disposed alongside the outer lateral surfaces of the upper legs 37. The abutment surfaces 64 are disposed along the riser pipe 28 opposite the yoke 34, and the riser pipe is disposed between the clamping axis 90 and the abutment surfaces 64.

The connecting member 82 is rotated and thereby threaded further into the bore 81 of the opposite attachment member 61 to effect relative movement between the attachment members 61 along the connecting axis 83 whereby the separation distance or spaced relation between the attachment members 61 along the connecting axis is reduced to obtain an attached position for the attachment members 61 on the riser brace 32. In the attached position, the connecting member 82 connects the attachment members 61 with the bottom surfaces 67 of the attachment members 61 in contact with the upper face 40 of the riser brace 32, the engagement elements 62 adjacent the outer base face 44, the first retaining walls 79 of the retaining members 78 in respective abutment with the outer lateral surfaces of the upper legs 37, and the upper legs 37 respectively disposed between the bottom surfaces 67 and the second retaining walls 80. The riser brace 32 is constrained from moving laterally, i.e. in a direction parallel to the connecting axis, due to confinement of the riser brace between the first retaining walls 79 of the retaining members 78. The riser brace 32 is constrained from moving vertically, i.e. in a direction parallel to the central longitudinal axis of the riser pipe 28, due to confinement of the upper legs 37 respectively between the bottom retaining surfaces 67 of the attachment members 61 and the second retaining walls 80 of the retaining members 78. The extent to which the connecting member 82 is rotated to obtain the attached position will depend upon the amount of compressive force to be applied by the first retaining walls 79 of the retaining members 78 against the upper legs 37 of the riser brace 32. However, it is not necessary that the riser brace 32 be compressed between the first retaining walls 79. For example, the connecting member 82 may be designed to bottom out in the attachment members 61 before a load is applied to upper legs 37 by the retaining members 78, and there may be a small clearance between the walls 79 and the legs 37 in the attached position. As the connecting member 82 is rotated to obtain the attached position, the other key 93 of the operating member 65 enters the second cavity section of the cavity 89 of the opposite clamp member 63 and is moved into the first cavity section of the cavity. The attachment members 61 serve to pivotally mount the corresponding clamp bodies 84 on the riser brace 32 and provide a rigid structural connection between the clamp bodies and the corresponding engagement elements 62.

Once the attachment members 61 are attached to the riser brace 32, the extension member 92 is rotated to move the clamp bodies 84 from the non-clamping position, wherein the abutment surfaces 64 do not forcefully contact the riser pipe, to a clamping position. The extension member 92 is rotated about its central longitudinal axis, which is also the clamping axis 90, to increase the longitudinal separation distance or spaced relation of the keys 93 along the extension member 92. The keys 93 bear against the coupling portions 86 of the clamp bodies 84 and forcefully urge the coupling portions 86 away from one another along the clamping axis 90. Increased separation of the coupling portions 86 by the operating member 65 along the clamping axis 90 causes the clamp bodies 84 to pivot in unison and in opposite directions about the pivots 85 such that the lever arm portions 87 are pivoted toward one another inwardly in a radial direction toward the riser pipe 28. The extension member 92 is rotated an amount sufficient to pivot the lever arm portions 87 an extent necessary to force the abutment surfaces 64 into contact with the riser pipe 28 at respective first and second radial locations and to respectively apply radial forces to the riser pipe at the radial locations which are reacted by forces applied by the engagement elements 62 at first and second locations on the yoke 34.

The radial forces applied by the clamp bodies 84 to the riser pipe 28 in the direction of the riser pipe central longitudinal axis are depicted by arrows in FIG. 7. As also depicted by arrows in FIG. 7, the reactive forces applied by the engagement elements 62 against the outer base face 44 of yoke 34 are applied in parallel directions perpendicular to the clamping axis and the central longitudinal axis of the riser pipe 28. The radial forces are applied by the abutment surfaces 64 at the first and second radial locations on the riser pipe 28 symmetrical to the central longitudinal axis 31 of the riser pipe. The reactive forces are applied by the engagement elements 62 at the first and second locations on the yoke 34 symmetrical to the central longitudinal axis 31 of the riser pipe 28 and essentially diagonal to the opposite abutment surface 64. In other words, the radial force applied by the first clamp member 63 is applied at a location essentially diagonal to the location at which the reactive force is applied by the second engagement element 62, and the radial force applied by the second clamp member 63 is applied at a location essentially diagonal to the location at which the reactive force is applied by the first engagement element 62. The riser pipe 28 and the riser brace 32 are thusly clamped together between the abutment surfaces 64 which are forced against the riser pipe 28 and the engagement elements 62 which are forced against the outer base face 44 of yoke 34.

The clamp assembly 60 applies a compressive or radial preload between the riser pipe 28 and riser brace 32 which holds the riser pipe and riser brace together, particularly in the event that the weld 56 between the riser pipe and the riser brace fails. The connecting member 82 carries compressive loads applied to the attachment members 61 and carries moment loads applied to the attachment members 61 and clamp members 63. The installation procedure may be inspected via a video camera and, when the appropriate attachment position and clamping position have been obtained, the connecting member 82 and the extension member 92 are crimp-locked and the clamp assembly 60 is left in place in the boiling water reactor as mechanically reinforcement for weld 56.

The clamp assembly 60 and the method of the present invention provide redundant structural support to the weld 56 between the riser pipe 28 and the riser brace 32. The clamp assembly 60 provides an alternate load path for loads from the riser pipe 28 to the riser brace 32 and ultimately to the reactor pressure vessel wall 12 or other attachment wall to which the ends of the riser brace 32 are attached. The present invention is particularly useful for repairing a cracked weld 56 between the riser pipe 28 and riser brace 32 and, in particular, cracking due to intergranular stress corrosion cracking. The apparatus and method of the present invention does not require electrode discharge machining or welding to secure the clamp assembly to the riser pipe and/or riser brace.

When the attachment members 61 are in the attached position on the riser brace 32, the attachment members 61 remain close to the outer peripheral portion of the riser brace 32 with only the engagement elements 62 and the first retaining walls 79 of retaining members 78 protruding a minimal distance beyond the outer peripheral portion of the riser brace 32. The attachment members 61 protrude beyond the inner peripheral portion of the riser brace 32 only an insignificant amount at the inside corners where the side members 35 are joined to the yoke 34 of the riser brace. When the clamp members 63 are in a clamping position the coupling portions 86 and the pivot portions 88 of the clamp bodies 84 are within the external perimeters of the corresponding attachment members 61 and only the lever arm portions 87 extend beyond the external perimeters of the attachment members. The lever arm portions 87 do not protrude beyond the outer peripheral portion of the riser brace 32 and, where the lever arm portions 87 protrude beyond the inner peripheral portion of the riser brace 32, the lever arm portions 87 follow the curvature of the riser pipe 28 and are close to the riser pipe 28. Accordingly, when the clamp assembly 60 is installed on the riser brace 32, the footprint of the riser brace is essential maintained thusly minimizing extension of structural components of the clamp assembly beyond the footprint of the riser brace that could potentially interfere with jet pump mixers, other internals or equipment installed in the reactor pressure vessel for future repairs or inspections.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A clamp assembly for clamping a riser brace to a riser pipe of a jet pump assembly in which the riser pipe has a central longitudinal axis and the riser brace has first and second side members extending from a yoke attached to the riser pipe with the side members extending transverse to the central longitudinal axis on opposite sides of the riser pipe, said clamp assembly comprising first and second clamp members mountable on the riser brace respectively on the opposite sides of the riser pipe, said first clamp member including a clamp body comprising a coupling portion, a lever arm portion and an abutment surface on said lever arm portion for being disposed along the riser pipe opposite the yoke, and a pivot between said coupling portion and said lever arm portion defining a pivot axis for said clamp body extending in the same direction as the central longitudinal axis of the riser pipe and about which said clamp body is pivotal, said second clamp member including a clamp body comprising a coupling portion, a lever arm portion and an abutment surface on said lever arm portion of said second clamp member for being disposed along the riser pipe opposite the yoke, and a pivot between said coupling portion of said second clamp member and said lever arm portion of said second clamp member defining a pivot axis for said clamp body of said second clamp member parallel to said pivot axis for said first clamp member and about which said clamp body of said second clamp member is pivotal;

first and second engagement elements respectively structurally connected to said first and second clamp members and securable on the riser brace with the yoke disposed between the riser pipe and said first and second engagement elements; and an operating member coupling said coupling portions in spaced relation along a clamping axis perpendicular to said pivot axes with the riser pipe disposed between said clamping axis and said abutment surfaces, said operating member being operable to move said coupling portions further away from one another along said clamping axis to effect pivotal movement of said clamp bodies in unison and in opposite directions about said pivot axes to force said abutment surfaces against the riser pipe at respective first and second radial locations to apply radial forces to the riser pipe at the radial locations and reacted by forces applied by said engagement elements to the yoke in parallel directions and on the opposite sides of the riser pipe.

2. The clamp assembly recited in claim 1 wherein said first engagement element is diagonal to said abutment surface of said second clamp member and said second engagement element is diagonal to said abutment surface of said first clamp member.

3. The clamp assembly recited in claim 1 wherein said operating member includes an externally threaded bolt having a central longitudinal axis defining said clamping axis and having opposing ends, and keys respectively disposed on said opposing ends, said keys being held in respective cavities within said coupling portions while said bolt is rotatable to move said keys longitudinally away from one another along said bolt.

4. The clamp assembly recited in claim 1 wherein said lever arm portions respectively have arcuate inside surfaces to curve around an outer circumference of the riser pipe.

5. The clamp assembly recited in claim 1 wherein said abutment surfaces are respectively defined by protrusions extending radially inwardly from said arcuate inside surfaces.

6. The clamp assembly recited in claim 1 and further comprising first and second attachment members on which said first and second clamp members are respectively pivotally mounted, and a connecting member for connecting said first and second attachment members on the riser brace in adjustable spaced relation along a connecting axis parallel to said clamping axis, said engagement elements being disposed respectively on said attachment members.

7. A clamp assembly for clamping a riser brace to a riser pipe of a jet pump assembly in which the riser pipe has a central longitudinal axis and the riser brace has first and second side members extending from a yoke attached to the riser pipe with the side members extending transverse to the central longitudinal axis on opposite sides of the riser pipe, said clamp assembly comprising a first attachment member for being disposed on the riser brace and having a retaining member for being disposed along the first side member of the riser brace and having an engagement element for being disposed along the yoke of the riser brace;

a second attachment member for being disposed on the riser brace and having a retaining member for being disposed along the second side member of the riser brace with the riser brace between said retaining members and having an engagement element for being disposed along the yoke of the riser brace with the yoke between said engagement elements and the riser pipe;

a connecting member connecting said attachment members in spaced relation along a connecting axis perpendicular to the side members of the riser brace, said connecting member being operable to decrease the space between said attachment members along said connecting axis to obtain an attached position in which said retaining members respectively engage the side members to secure the riser brace between said retaining members;

a first clamp body pivotally mounted on said first attachment member and having an abutment surface for being disposed along the riser pipe opposite said engagement element of said first attachment member;

a second clamp body pivotally mounted on said second attachment member and having an abutment surface for being disposed along the riser pipe opposite said engagement element of said second attachment member; and an operating member coupling said first and second clamp bodies along a clamping axis and being operable to pivot said clamp bodies to a clamping position in which said abutment surfaces contact and apply forces to the riser pipe whereby the riser pipe and riser brace are clamped together between said abutment surfaces and said engagement elements.

8. The clamp assembly recited in claim 7 wherein said abutment surfaces contact and apply said forces to the riser pipe at locations radial and symmetrical to the central longitudinal axis of the riser pipe and said engagement elements apply forces to the yoke in parallel directions symmetrical with and on the opposite sides of the central longitudinal axis of the riser pipe in the clamping position.

9. The clamp assembly recited in claim 7 wherein said retaining members respectively comprise retaining walls in abutting engagement with the respective side members in the attached position and between which the riser brace is secured in the attached position, said connecting axis being perpendicular to said retaining walls.

10. The clamp assembly recited in claim 9 wherein said engagement elements respectively comprise planar shear tabs in abutment with the yoke in the clamping position, said tabs being perpendicular to said retaining walls.

11. The clamp assembly recited in claim 8 wherein said connecting member includes a bolt adjustably connecting said first and second attachment members and having a central longitudinal axis defining said connecting axis, said operating member includes a bolt adjustably coupling said first and second clamp bodies and having a central longitudinal axis defining said clamping axis parallel to said connecting axis, and further including first and second pivots respectively mounting said first and second clamp bodies on said first and second attachment members, said pivots respectively defining pivot axes for said clamp bodies perpendicular to said connecting axis and said clamping axis.

12. The clamp assembly recited in claim 7 wherein said engagement element of said first attachment member is diagonal to said abutment surface of said second clamp body and said engagement element of said second attachment member is diagonal to said abutment surface of said first clamp body in the clamping position.

\* \* \* \* \*